United States Patent
Schürer et al.

(10) Patent No.: US 10,064,015 B2
(45) Date of Patent: Aug. 28, 2018

(54) IDENTIFICATION OF SELECTED MOBILE COMPUTING DEVICES AT A VENUE

(71) Applicant: Fanpictor AG, Zürich (CH)

(72) Inventors: Stephan Schürer, Männedorf (CH); Reto Scheidegger, Zürich (CH)

(73) Assignee: Fanpictor AG, Zurich (CH)

(*) Notice: Subject to any disclaimer, the term of this patent is extended or adjusted under 35 U.S.C. 154(b) by 0 days.

(21) Appl. No.: 15/238,188

(22) Filed: Aug. 16, 2016

(65) Prior Publication Data

US 2017/0055129 A1    Feb. 23, 2017

(30) Foreign Application Priority Data

Aug. 17, 2015  (EP) .................................... 15181267

(51) Int. Cl.
| | | |
|---|---|---|
| *H04W 4/02* | (2018.01) | |
| *H04W 4/90* | (2018.01) | |
| *H04W 4/021* | (2018.01) | |
| *H04W 4/08* | (2009.01) | |
| *H04L 12/26* | (2006.01) | |
| *H04W 4/06* | (2009.01) | |
| *H04W 4/21* | (2018.01) | |

(52) U.S. Cl.
CPC ........... *H04W 4/025* (2013.01); *H04L 43/106* (2013.01); *H04W 4/021* (2013.01); *H04W 4/06* (2013.01); *H04W 4/08* (2013.01); *H04W 4/90* (2018.02); *H04W 4/21* (2018.02)

(58) Field of Classification Search
CPC ......... H04M 1/72519; H04M 1/72547; H04M 1/72522; H04M 1/72583; H04M 1/0214; G06Q 30/02; H04L 29/08108; H04L 29/08657; H04L 29/08936; H04W 4/00; H04W 4/02; H04W 64/00
See application file for complete search history.

(56) References Cited

U.S. PATENT DOCUMENTS 8,499,038 B1   7/2013  Vucurevich
8,909,299 B2   12/2014 Mercuri et al.
(Continued)

FOREIGN PATENT DOCUMENTS

WO   WO 2014/068065 A2   5/2014
WO   WO 2014/096861 A2   6/2014

OTHER PUBLICATIONS

Extended European Search Report dated Oct. 16, 2015 in European Appl. 15181267.4 (7 pgs.).

*Primary Examiner* — Sharad Rampuria
(74) *Attorney, Agent, or Firm* — Foley & Lardner LLP (57) ABSTRACT

A method for identifying a subset (41) out of a set (40) of mobile computing devices (10) at a venue (30) comprises broadcasting a trigger signal to the set of mobile computing devices at the venue, receiving the trigger signal by the mobile computing devices in the set, and rendering visual content on the displays of the mobile computing devices in the set after reception of the trigger signal. Subsequently those mobile computing devices that are not part of the subset are caused to stop rendering the visual content, while those mobile computing devices that are part of the subset continue to render the visual content. Finally only those mobile computing devices that belong to the subset remain rendering the visual content.

21 Claims, 7 Drawing Sheets

(56) References Cited

U.S. PATENT DOCUMENTS

| | | | |
|---|---|---|---|
| 2006/0010199 A1* | 1/2006 | Brailean | H04L 29/06027 |
| | | | 709/204 |
| 2008/0139229 A1 | 6/2008 | Bailey et al. | |
| 2010/0293049 A1* | 11/2010 | Maher | G06F 17/30699 |
| | | | 705/14.46 |
| 2011/0041140 A1* | 2/2011 | Harm | G06F 9/4843 |
| | | | 719/318 |
| 2013/0109364 A1* | 5/2013 | Mercuri | H04M 3/42 |
| | | | 455/414.2 |
| 2014/0313103 A1 | 10/2014 | Goel et al. | |
| 2015/0081071 A1 | 3/2015 | Lea et al. | |
| 2015/0189490 A1* | 7/2015 | Chan | H04W 8/02 |
| | | | 455/419 |

\* cited by examiner

IDENTIFICATION OF SELECTED MOBILE COMPUTING DEVICES AT A VENUE

TECHNICAL FIELD

The present invention relates to a method for identifying a subset of one or more mobile computing devices out of a set of mobile computing devices at a venue, to a portable device configured to carry out the method, and to a computer program product for causing mobile computing devices to carry out the method.

PRIOR ART

It is known to employ the displays of mobile computing devices such as mobile telephones or tablet computers to create distributed ad-hoc images at an event venue like a sports stadium or a concert hall, each mobile computing device representing a pixel of the distributed ad-hoc image. Hundreds or even thousands of visitors may be present at such a venue and may participate in the creation of large ad-hoc images, thus adding to the visitors' experience at the event.

Various aspects associated with the formation and synchronization of such ad-hoc images at a venue are disclosed, e.g., in WO 2014/096861 A2, WO 2014/068065 A2, U.S. Pat. No. 8,499,038 B1, U.S. Pat. No. 8,909,299 B2 and US 2015/0081071 A1.

SUMMARY OF THE INVENTION

In the setting of an event venue, it may be desirable to single out one or more selected audience members for various reasons, e.g., in order to direct the attention of other audience member to the selected audience members, or in order to alert the selected audience members to an emergency situation. Since nowadays virtually anyone carries a smartphone, a tablet computer or another type of mobile computing device, the present invention employs such mobile computing devices to carry out that task.

In a first aspect, the present invention provides a method of identifying a subset of one or more mobile computing devices out of a possibly large set of mobile computing devices at an event venue like a sports stadium or concert hall. The method comprises:
  broadcasting a trigger signal to the set of mobile computing devices at the venue;
  receiving said trigger signal by the mobile computing devices in the set;
  triggered by the reception of the trigger signal, rendering visual content on the displays of the mobile computing devices in the set; and
  subsequently causing those mobile computing devices that are not part of said subset to stop rendering said visual content while those mobile computing devices that are part of said subset continue to render said visual content, until only those devices that belong to said subset remain rendering said visual content.

The mobile computing devices may be, in particular, mobile phones (including smartphones having a touchscreen display), tablet computers or other types of portable computers. In principle, any mobile computing device that has a display and basic communication capabilities may be employed. After reception of the trigger signal, the displays of all active mobile computing devices in the set are activated to display specific visual content. In this manner the audience members in the venue are alerted to the fact that specific content is now being displayed. However, at that point in time each individual audience member does not yet know whether he or she is the final addressee of the information that is intended to be conveyed. The intended addressee(s) are subsequently made visible and thus are identified by stopping the displaying of relevant visual content on the displays of the devices of those audience members who are not the intended addressee(s), i.e., of those devices that do not belong to the subset. In this manner, the subset is clearly made visible. A key advantage of this method is that initially many or all visitors are alerted and prompted to pay attention to what is being displayed on their devices. In this manner the likelihood that the intended addressee(s) (i.e., the users of the mobile computing devices of the subset) miss the fact that they are just being addressed is much diminished. A further advantage is that it may be made readily apparent to many or all visitors who is being addressed. This is particularly true if the users are instructed to hold their devices in such a manner that their displays are clearly visible to other members of the audience in the venue.

In one application, the method may implement a lottery. In particular, it may be employed to identify the winner(s) of the lottery among the audience at the venue, so as to make them visible to the other audience members. In this case, the mobile devices in the subset indicate that their users have just won a prize in the lottery, i.e., the mobile computing devices in the subset are assigned a lottery prize. The method may further be employed to randomly select the winner(s), as will be described in more detail below.

In another application, the method may implement an emergency response scheme. For instance, the method may be employed to alert emergency response personnel, "normal" audience members who have been specifically instructed for handling emergency situations, or any other subset of persons at the venue in an emergency situation. Due to the often extremely high noise levels at sports events or rock concerts, acoustic means for alerting these persons may fail. In the present method, initially a large number of mobile computing devices are activated for alerting purposes. Those audience members who have their mobile computing devices stowed away in a pocket will be alerted by the activation of the displays of all other devices in their surrounding that relevant content is starting to be displayed, and will thus be prompted to activate their own mobile computing devices and make their displays visible. After some time, the content will be stopped to be displayed on the majority of the devices and will continue to be displayed only on the devices of a selected subset of persons, thereby instructing these persons to take certain actions.

The visual content that is displayed by each mobile computing device may be at least one of an essentially uniformly illuminated screen, a blinking pattern, a color sequence, a text message, an image, an image sequence, and a movie. A blinking pattern may be advantageous to cause increased attention to the content being displayed by the mobile computing devices. Each individual mobile computing device may display different visual content; e.g., each mobile computing device may display a different color, a differently timed blinking pattern, a different color sequence, a different text message, a different image, a different image, a different image sequence etc. Each individual mobile computing device may form a pixel of a distributed ad-hoc image created by the set of mobile computing devices. The thus formed ad-hoc image may be static or may change over time, i.e., it may represent a so-called choreography.

Depending on the application, it may be desirable that the number of displays of the mobile computing devices that are activated (i.e. the number of mobile computing devices that display visual content) gradually decreases after the initial trigger to create the impression of a gradual fade-out, or to focus the attention to a specific spot at the venue by keeping only the display of those devices activated that are at a gradually decreasing distance from the device(s) of the subset. In other words, it may be desirable that the number of mobile computing devices in the set that are caused to stop rendering said visual content after the rendering of visual content has been started gradually increases, until only those devices that belong to the subset remain rendering the visual content. The time span over which the number of stopped devices gradually increases may be, e.g., between 5 and 120 seconds, preferably between 10 and 60 seconds, so as to create a clearly visible overall fading or focusing effect.

In advantageous embodiments, the trigger signal is transmitted to the set of mobile computing devices via an audio signal. This may be advantageous over other triggering methods, e.g., over methods that would employ the wireless network capabilities of the mobile computing devices to connect the devices to an IP network, since it may be difficult to simultaneously connect a very large number of mobile computing devices at the same location to a wireless network. Methods for transmitting a trigger signal to a plurality of mobile computing devices via an audio signal are known in the art. In these methods, the trigger signal is modulated to an audio signal, and the audio signal is broadcast to the mobile computing devices in the set, employing suitable amplifiers and loudspeakers. The mobile computing devices receive the audio signal with their built-in microphones and demodulate the trigger signal from the audio signal. The trigger signal may be modulated to a portion of the audio signal that has at least one frequency component or is fully contained in the frequency range above 17 kHz, preferably between 17 kHz and 25 kHz, more preferably between 17 kHz and 20 kHz. Possible implementations of the transmission of a trigger signal to mobile computing devices via audio signals are described, e.g., in US 2015/0081071, whose content is incorporated herein by reference in its entirety.

The subset may consist of one single mobile computing device. For instance, if the method implements a lottery, the single mobile computing device may indicate the winner of the lottery. In other applications, the subset may consist of two, three, four, five, six, seven, eight, nine, ten or more mobile computing devices. It is preferred, however, if the subset represents at most 10%, preferably at most 5%, possibly even at most 1% of the mobile computing devices in the entire set, in order to ensure that the mobile computing devices of the subset will be readily discernible by the method. The entire set of mobile computing devices may be large, e.g., it may comprise more than 100 or even more than 1'000 mobile computing devices.

For implementing the method, it is advantageous to assign an identifier to each mobile computing device in the set. The method may then comprise:

selecting a subset of the identifiers (the subset possibly consisting of one single identifier);
transmitting selection data to the set of mobile computing devices, the selection data representing the selected subset;
receiving the selection data by the mobile computing devices;
in each mobile computing device, comparing the received selection data with the identifier of the respective mobile computing device;
determining that the respective mobile computing device is part of the subset if the identifier matches the selection data.

The identifier may be unique for each mobile computing device. The selection data may be transmitted to the mobile computing devices via an audio signal. This may be carried out in essentially the same manner as in the transmission of the trigger signal, i.e. an audio signal may be modulated with the selection data, and the audio signal may be broadcast to the mobile computing devices in the set, employing suitable amplifiers and loudspeakers. The mobile computing devices would receive the audio signal with their built-in microphones and demodulate the selection data from the audio signal. As described above in conjunction with the trigger signal, the selection data may be modulated to a portion of the audio signal that has at least one frequency component or is fully contained in the frequency range above 17 kHz, preferably between 17 kHz and 25 kHz, more preferably between 17 kHz and 20 kHz.

In another embodiment, identifiers are transmitted to the mobile computing devices and compared to match criteria stored in the mobile computing devices. In this case, it is not strictly necessary to transmit selection data to the mobile computing devices. Instead, the match criteria may be stored in the mobile computing device already before the actual identification method is carried out. For instance, a match criterion may have been stored in each mobile computing device long before the trigger signal, e.g. with the download of an app that runs on the mobile computing device, the match criterion being of the form "if the received identifier has value X, then the mobile computing device is part of the selected subset".

In order to ensure that the identifiers can be transmitted to a possibly very large set of mobile computing devices in an orderly manner, the method may comprise:

causing each mobile computing device in the set to create a random time stamp after receiving the trigger signal;
causing each mobile computing device to connect to a server and send an identifier request to said server at a point in time that corresponds to the random time stamp;
when the server receives an identifier request from a mobile computing device, transmitting an identifier from the server to the corresponding mobile computing device;
determining that the respective mobile computing device is part of the subset if the transmitted identifier meets a match criterion.

As explained above, the definition of the match criterion may take place long before the trigger signal, e.g., the match criterion may be coded already into an app stored in the mobile computing devices.

In some embodiments, the transmitted identifiers define a sequential order of the mobile computing devices in the set according to the sequence of reception of the identifier requests by the server. For instance, the first mobile computing device from which the server receives an identifier request might receive the identifier "#1", the second mobile computing device might receive the identifier "#2", the third mobile computing device might receive the identifier "#3", and so on. The subset of mobile computing devices may then be defined to consist of the first n mobile computing devices in the sequence, n being a natural number that is at least one. For instance, if the subset consists of a single mobile computing device, the subset would consist of the mobile computing device that has received the identifier "#1". Since the time at which each mobile computing device sends its identifier request to the server is random, in this manner a random selection of mobile computing devices can be carried out. This can be readily employed to implement a lottery.

In a second aspect, the present invention provides a mobile computing device that is configured to carry out at least portions of the above-described method. The mobile computing device comprises:

a processor;

a display; and a non-transitory memory device (e.g. a mass storage device such as a flash memory device).

The non-transitory memory device stores software instructions to cause the processor to carry out the following method:

receiving a trigger signal;

upon detection of the trigger signal, causing the display to render visual content;

determining whether the mobile computing device is part of a subset of a set of mobile computing devices in a venue; and depending on whether the portable device is part of said subset, adjusting a time span during which the mobile computing device renders said visual content.

In other words, the software instructions include a trigger receiving module for receiving the trigger signal, a content rendering module for rendering the visual content, a determination module for determining whether the mobile computing device is part of a subset of a set of mobile computing devices in a venue, and a time adjusting module for adjusting the time span during which the mobile computing device renders said visual content.

In a third aspect, the present invention provides a computer program product that comprises the above-defined software instructions. The computer program product may comprise a non-transitory data carrier storing the software instructions.

The mobile computing device may comprise a microphone, and the software instructions of the second and third aspect of the present invention may be configured to cause the processor to carry out the following method of receiving the trigger signal:

receiving an audio signal by the microphone; and monitoring the audio signal to detect the trigger signal from the audio signal.

In other words, the trigger receiving module may comprise an audio receiving module to receiving the audio signal by the microphone, and a (first) audio monitoring module for monitoring the audio signal to detect the trigger signal.

The non-transitory memory device or a transitory memory device of the mobile computing device may store an identifier of the mobile computing device, and the software instructions may be configured to cause the processor to carry out the following method of determining whether the mobile computing device is part of said subset:

receiving selection data representing said subset;

comparing the selection data with said identifier; and determining that the mobile computing device is part of the subset if the identifier matches the selection data.

In other words, the determination module may comprise a selection data receiving module for receiving the selection data, a comparing module for comparing the selection data with said identifier, and a matching module for determining whether the identifier matches the selection data.

In particular, the software instructions may be configured to cause the processor to carry out the following method of receiving the selection data:

receiving an audio signal by the microphone;

monitoring the audio signal to detect the selection data from the audio signal.

In other words, the trigger receiving module may comprise an audio receiving module to receiving the audio signal by the microphone, and a (second) audio monitoring module for monitoring the audio signal to detect the selection data from the audio signal.

In some embodiments, the software instructions may be configured to cause the processor to carry out the following method of determining whether the mobile computing device is part of said subset:

creating a random time stamp after receiving the trigger signal;

connecting the mobile computing device to a server and sending an identifier request to said server at a point in time that corresponds to the random time stamp;

receiving an identifier from the server based upon said identifier request; and determining that the mobile computing device is part of the subset if the identifier matches a match criterion.

In other words, the determination module may comprise a random number generating module for creating the random time stamp, a requesting module for connecting the mobile computing device to a server and sending an identifier request to said server at a point in time that corresponds to the random time stamp, an identifier receiving module for receiving the identifier from the server based upon said identifier request, and a matching module for determining that the mobile computing device is part of the subset if the identifier matches a match criterion.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
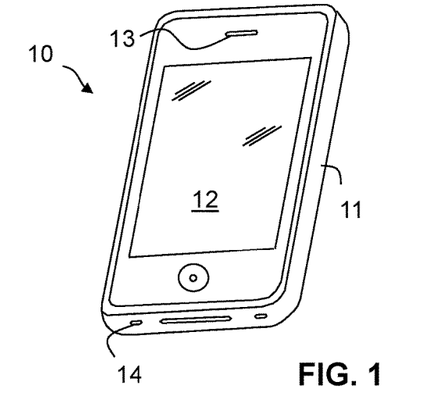
FIG. 1 shows a schematic external view of a mobile phone.

FIG. 1 illustrates a mobile computing device in the form of a smartphone 10. The smartphone 10 comprises, inter alia, a housing 11, a touchscreen display 12, a loudspeaker 13 and a microphone 14.

Figure 2:
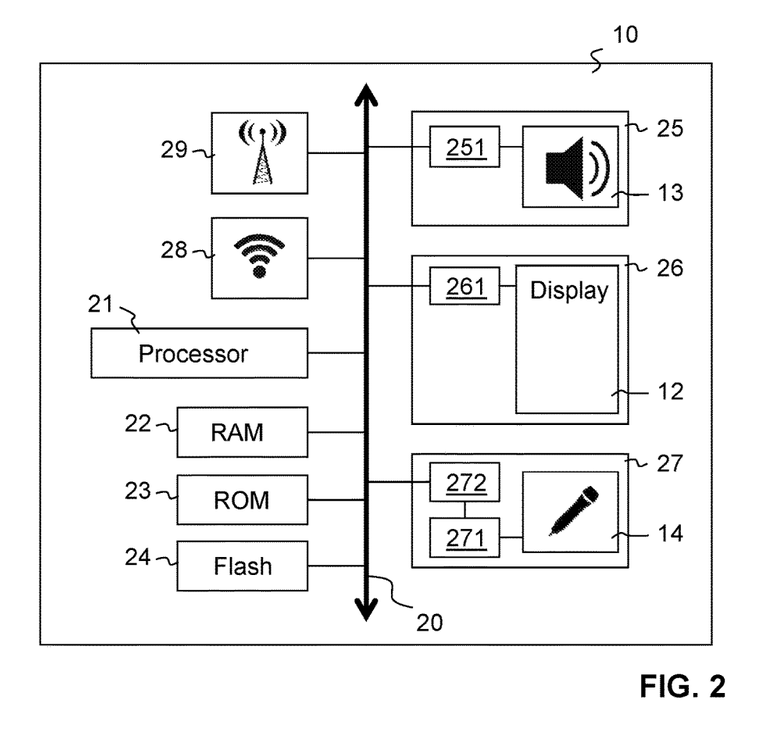
FIG. 2 shows a schematic hardware-oriented block diagram of a mobile phone.

FIG. 2 shows a schematic hardware-oriented block diagram of the smartphone 10. A processor 21 is connected via one or more bus structures 20 to RAM memory 22, to ROM memory 23, to a mass storage device 24, to an audio output device 25, to a visual content renderer 26, to an audio input device 27, and to various wireless data communication interfaces 28, 29. The ROM memory 23 stores, inter alia, the firmware of the smartphone. The mass storage device 24 is a non-transitory memory device, e.g., a flash memory device, which can be built into the smartphone or which can at least in part be an exchangeable memory card. The mass storage device stores, inter alia, an app, i.e., application software, to execute the various functions of the smartphone that are described below. The audio output device 25 includes the loudspeaker 13 and suitable driving circuitry 251 for rendering audio content through the loudspeaker 13. The visual content renderer 26 includes the touchscreen display 12 and suitable driving circuitry 261 to render content on the display and to detect input via the touchscreen. The audio input device 27 includes the microphone 14, an analog-to-digital converter 271 to digitize the audio signals received by the microphone 14, and buffer circuitry 272 to receive and buffer the digitized audio signals. The wireless data communication interfaces 28, 29 can include, for instance, a WLAN (WiFi) module and/or a mobile telecommunication module for communication with a cellular network like a 3G (UMTS) or 4G (LTE) network. Of course, the above list is by no means limiting, and various other components may additionally be present in the smartphone.

Figure 3:
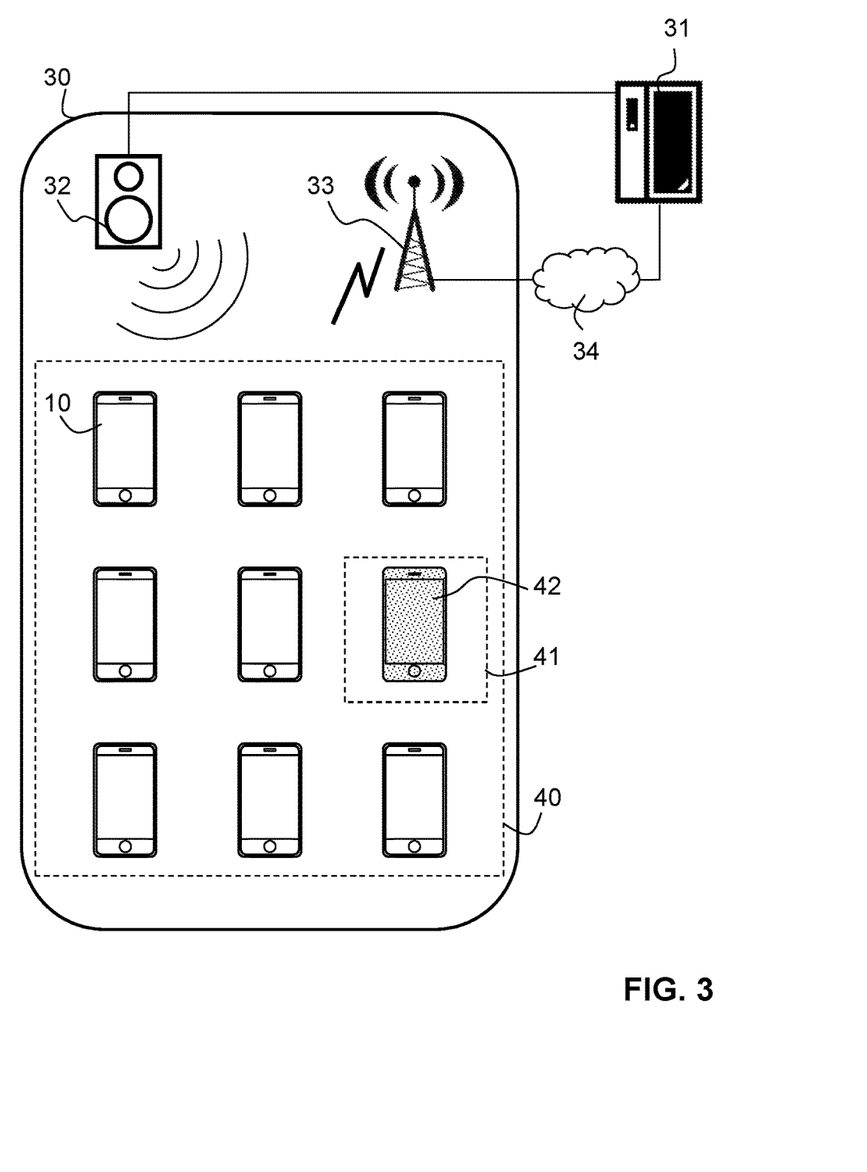
FIG. 3 illustrates a setting at an event venue.

FIG. 3 illustrates, in a highly schematic manner, a typical setting at an event venue 30. A possibly large number of audience members are present at the venue, many of the audience members carrying a smartphone 10 or another kind of mobile computing device. The active smartphones 10 of all audience members define a set 40 of smartphones or other mobile computing devices. At a location that can be at the venue or remote from the venue, a server 31 is provided. Instead of providing a single server, a multiplicity of servers can be provided to distribute the various tasks associated with the method of the present invention, as explained in more detail below, among these servers. However, for simplicity, it is assumed that all tasks are carried out by the same server. The server 31 connects to a radio transmission device 33, e.g., a WLAN station and/or a base station of a cellular telephone network, either directly or via an IP network 34. The server further connects, either directly or via an IP network, to an audio transmission device 32, which may include one or more loudspeakers at the venue and suitable driving circuitry for the loudspeakers. Smartphone 42 is highlighted in FIG. 3. This smartphone is defined to form a subset 41 whose only member is the smartphone 42, and it is desired to identify this subset in the venue and to make clearly apparent which smartphone belongs to that subset.

Figure 4:
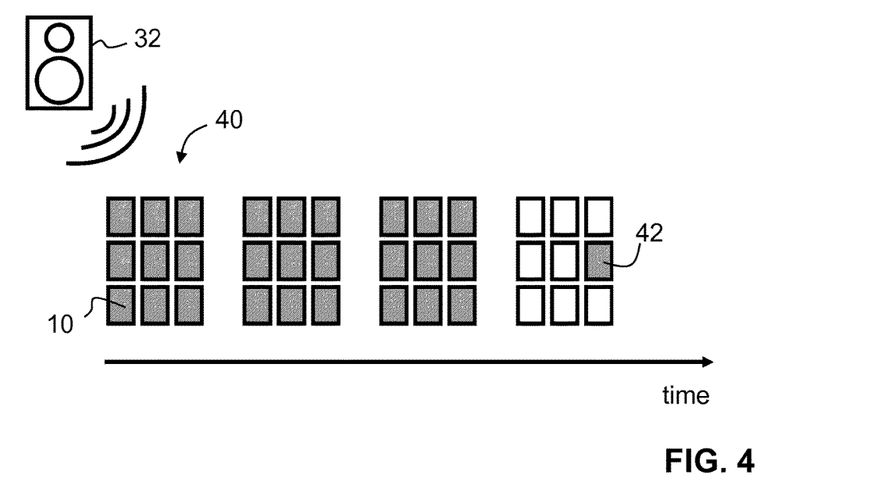
FIG. 4 illustrates a first example of a content rendering scheme.

FIG. 4 illustrates a first exemplary embodiment of a scheme of rendering visual content so as to highlight smartphone 42 which forms the subset 41. The server 31 causes the audio transmission device 32 to broadcast a trigger signal to all active smartphones 10 at the venue, i.e., to all smartphones within the set 40. After receipt of the trigger signal, all smartphones 10 in the set 40 start to display visual content, e.g., a blinking pattern that switches the displays of all smartphones between a uniformly illuminated state and a dark state in a synchronized manner. The blinking of a large number of smartphones in synchrony will alert all audience members to the fact that something is being displayed on their smartphones and cause all audience members to pay attention to what is going on. The blinking pattern then gets slower, until after the last dark state of all smartphones only the display of smartphone 42 (i.e. the only smartphone in subset 41) is illuminated and either remains in that state or continues to blink. In other words, only the smartphone 42 which is in subset 41 continues to render visual content that is specific to the method, while all other smartphones 10 have stopped rendering the specific visual content.

Figure 5:
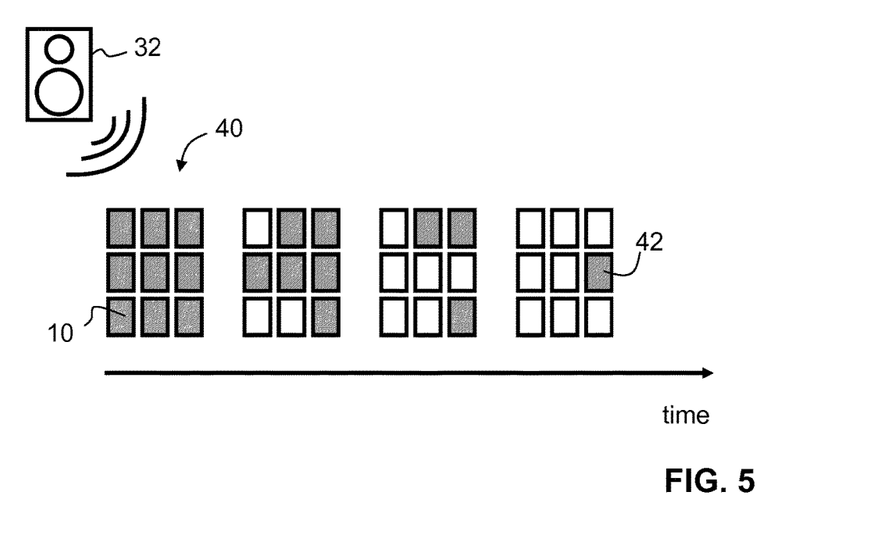
FIG. 5 illustrates a second example of a content rendering scheme.

FIG. 5 illustrates a second exemplary embodiment of a scheme of rendering visual content so as to highlight smartphone 42. The scheme starts as in the example of FIG. 4. However, instead of keeping all smartphones display the same content in synchrony, gradually less and less smartphones stop displaying content and acquire a dark state, until only smartphone 42 stays illuminated and continues to display content. This can be done in such a manner that the audience is visually guided or focused towards smartphone 42, i.e., by causing smartphones that are close to smartphone 42 to display content for a longer time than smartphones that are further away from smartphone 42. Distances between smartphones can be determined, e.g., by employing seat location data that has been entered by the audience members into their smartphones prior to executing the above-described scheme, e.g., by having the users enter their ticket information into an app that runs on the smartphone prior to the event. The use of seat location information for displaying ad-hoc images is described, e.g., in U.S. Pat. No. 8,909,299 B2, to which reference is made.

Figure 6:
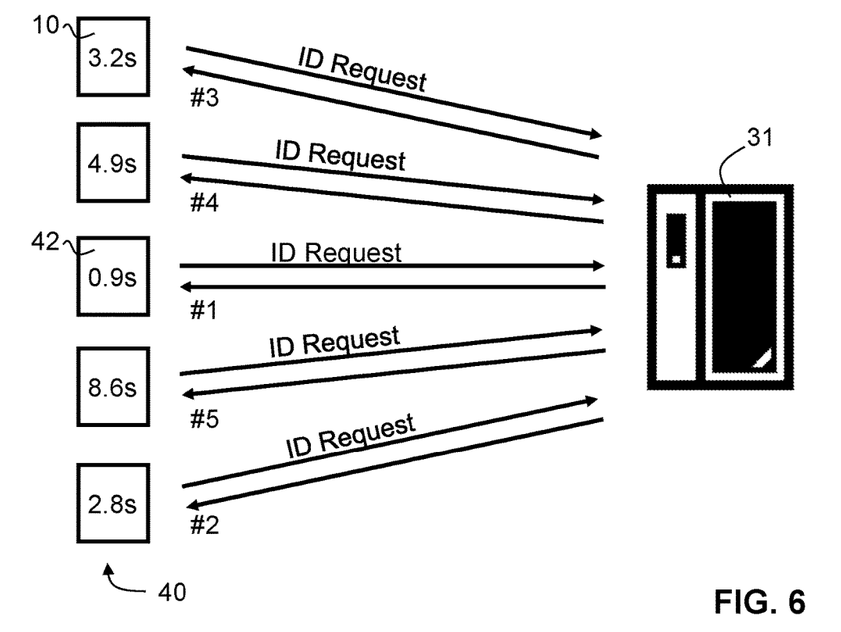
FIG. 6 illustrates a first example of a method of determining whether a mobile computing device belongs to a subset.

FIG. 6 illustrates a first scheme how the smartphones in set 40 can determine whether they belong to subset 41. Each smartphone 10 has a random number generator. After receipt of the trigger signal, each smartphone uses the random number generator to generate a random number representing a random time stamp. In the present example, the smartphones shown in FIG. 6 generate the following random time stamps: 3.2 seconds, 4.9 seconds, 0.9 seconds, 8.6 seconds, and 2.8 seconds. At a time after receipt of the trigger signal that corresponds to the random time stamp, each smartphone uses one or more of its wireless data communication interfaces 28, 29 to attempt to connect to server 31 through the radio transmission device 33 and the IP network 34 to request an identifier (ID). By causing the smartphones to generate random numbers, it is avoided that all smartphones attempt to connect to server 31 simultaneously, which would cause excessive traffic through radio transmission device 33. Once the connection has been established and the ID request has been received by the server, the server generates an identifier for the smartphone and sends it to the smartphone. In the present example, the smartphone that has connected first receives the identifier "#1", the smartphone that has connected second receives identifier "#2", and so on. In other words, the smartphones receive sequentially ordered identifiers #1, #2, #3, . . . , #n in the order in which they connect to the server. The smartphones store a match criterion and compare the match criterion to the received identifier. In the present example, the match criterion is whether the identifier is "#1"; if this is the case, the smartphone belongs to the subset.

The example of FIG. 6 defines a scheme to arbitrarily select one of the smartphones by pure chance, i.e., the generation of random time stamps does not only avoid network traffic congestion, but is also utilized to implement a random selection scheme. However, other (random or non-random) selection schemes are conceivable. For instance, the server could analyze identification data of each smartphone when it connects to the server (e.g., the cell phone number, the MAC address, the manufacturer and model of the smartphone, the previously entered seat location data etc.) and could generate the identifier based on such data to deliberately select smartphones meeting certain criteria. For instance, the server could send the identifier "#1" to all smartphones of a certain manufacturer or at selected seat locations to highlight these smartphones at the venue.

Figure 7:
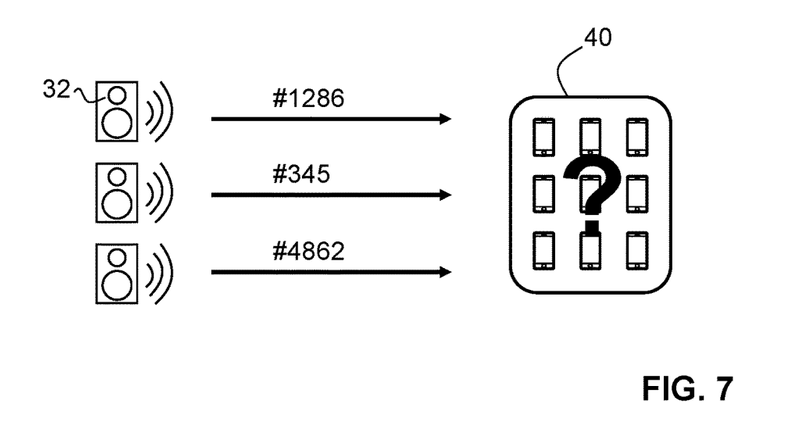
FIG. 7 illustrates a second example of a method of determining whether a mobile computing device belongs to a subset.

FIG. 7 illustrates a second scheme how the smartphones 10 of set 40 can determine whether they belong to subset 41. Each smartphone at the venue has been assigned an identifier beforehand and stores the identifier in its memory. For instance, the identifier may have been stored in the smartphone already during installation of the app. The server 31 now causes the audio transmission device 32 to broadcast one or more of these identifiers via an audio signal. In the present example, it first broadcasts the identifier #1286. All smartphones within set 40 receive this identifier (or, more generally speaking, they receive selection data comprising the identifier), and compare the identifier with the stored identifier in their memory. If the identifiers match one another, the smartphone belongs to the subset. The server 31 may continue to broadcast further identifiers to increase the size of the subset, or is may do so only upon the occurrence of certain conditions. For instance, if it turns out that the smartphone with identifier #1286 is not present at the venue or is nor active, the server may send the next identifier, e.g., #345, and so on. If the method implements a lottery, the identifiers that are broadcast may be randomly selected. In other applications, they may be predetermined.

The schemes of FIGS. 6 and 7 may also be combined. For instance, the scheme of FIG. 6 may be employed to initially assign identifiers to the smartphones via a network connection, while the scheme of FIG. 7 may thereafter be used to broadcast selection data that include the match criteria to be applied to these identifiers (e.g., data about those identifiers which correspond to smartphones belonging to the subset) via audio.

Figure 8:
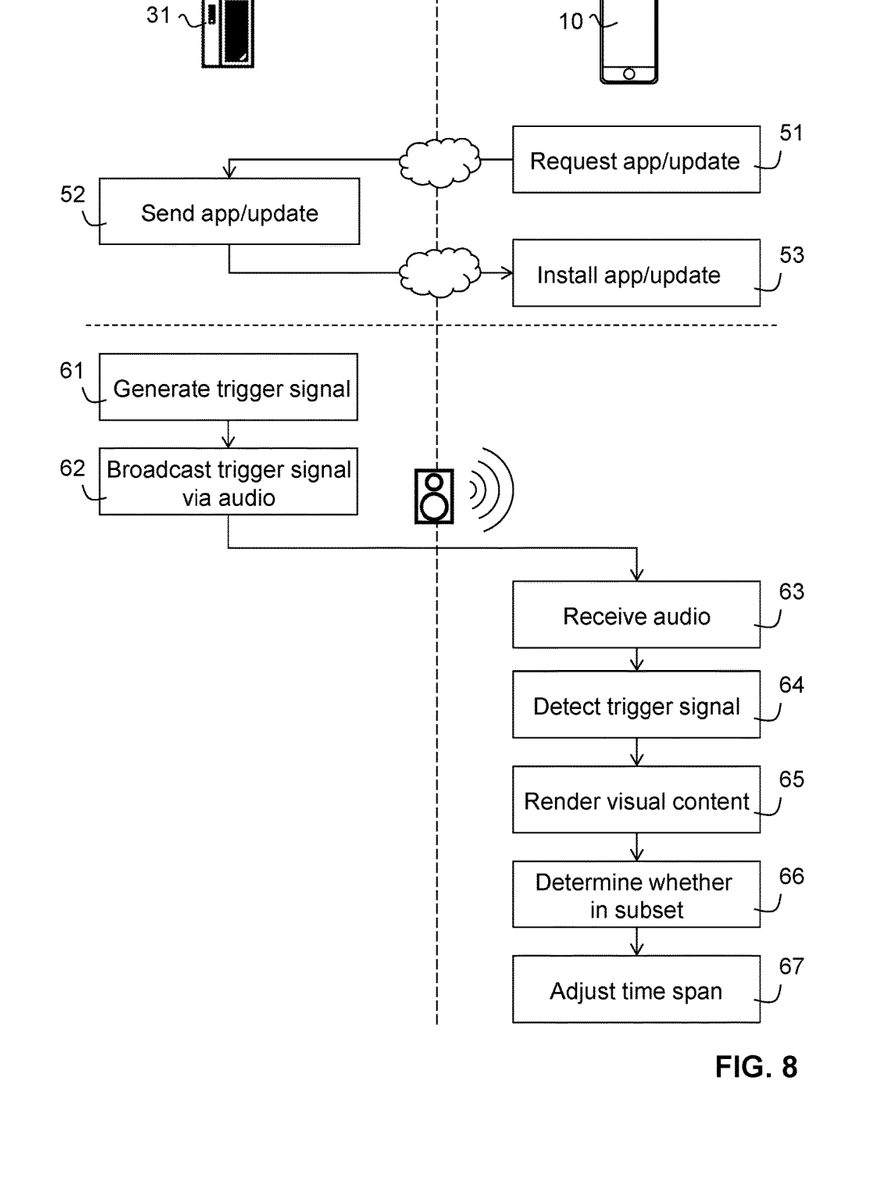
FIG. 8 is a flow chart for a possible implementation of a method according to the present invention.

FIG. 8 is a flow diagram illustrating a possible basic sequence of events when the method of the present invention is carried out. In step 51, smartphone 10 contacts the server 31 (or another server such as a server of Google Play™ or Apple™ AppStore) through an IP network to obtain an app or an update to an existing app, the app containing software instructions for carrying out the method. This download of the app can be done at home or elsewhere before entering the venue, or it can still be done at the venue if network reception is available at the venue. In step 52, the server sends the app or update to the smartphone 10. In step 53, the smartphone 10 receives the app or update and installs it in its mass storage device 24 for execution in the processor 21.

Once the user of the smartphone has entered the venue, he or she starts the app on the smartphone. The processor 21 of the smartphone 10 will now start to execute the software instructions of the app. These instructions cause the processor 21 to activate the audio input device 27 so as to listen to sound in the surroundings of the mobile phone 10. The processor monitors the sound recorded by the audio input device 27 for a trigger signal.

When it is desired to highlight one or more of the smartphones in the venue (i.e., to identify a subset of all smartphones in the venue), the server 31 generates a trigger signal in step 61 and causes the audio transmission device 32 in step 62 to broadcast a trigger signal in the frequency region above 17 kHz. In step 63, the smartphone receives the audio signals from the audio transmission device 32, and it detects the trigger signal in step 64. Immediately or at a certain time after reception of the trigger signal, the smartphone starts to render visual content in step 65. It then determines whether the smartphone is in the subset (step 66) and accordingly adjusts the time span during which it renders the content (and it possibly adjusts the content itself) in step 67.

Figure 9:
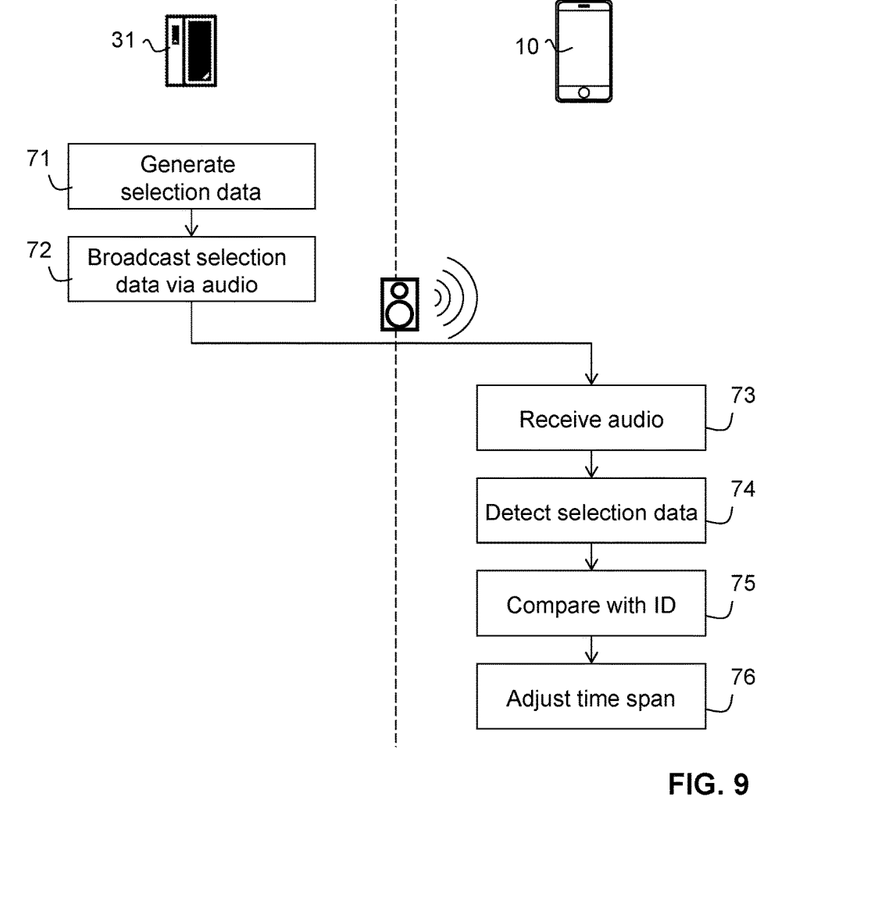
FIG. 9 is a flow chart for a possible implementation of the method of FIG. 6.

FIG. 9 is a flow diagram illustrating a possible sequence of steps for the determination scheme that was explained in connection with FIG. 6. In step 71, the server 31 generates selection data. In step 72, it broadcasts the selection data via the audio transmission device 32. In step 73, the smartphone 10 receives the audio signals. It detects selection data from the audio signals (step 74) and compares them with its own ID to determine whether the smartphone is part of the subset (step 75). It then adjusts the time span during which it renders the content (and it possibly adjusts the content itself) in step 76.

Figure 10:
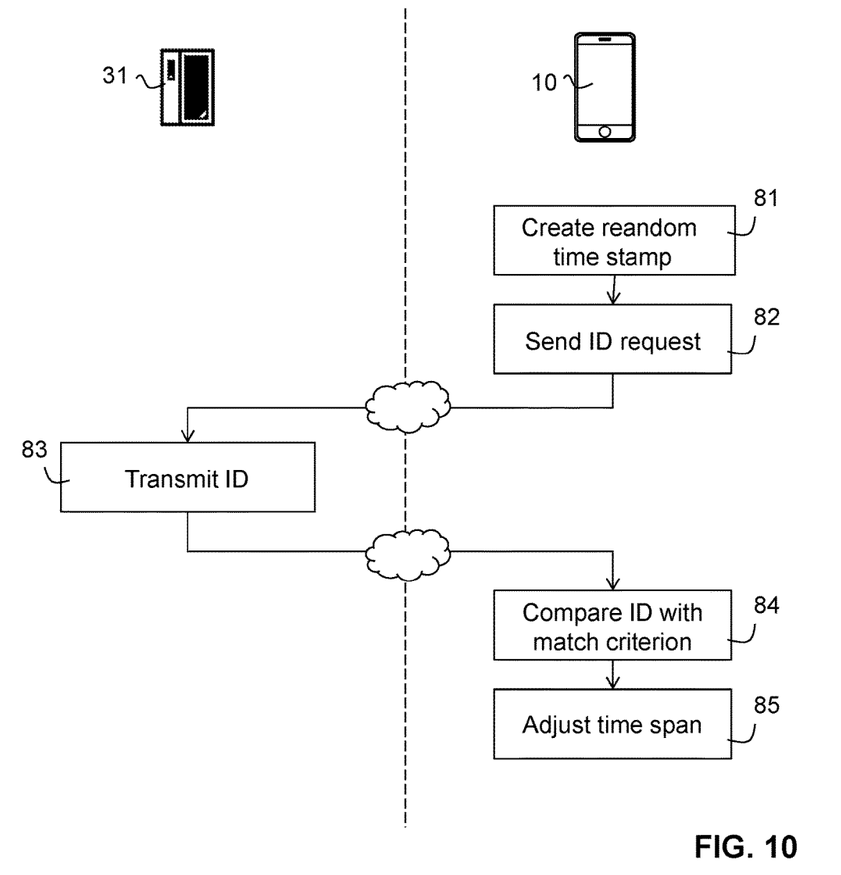
FIG. 10 is a flow chart for a possible implementation of the method of FIG. 7.

FIG. 10 is a flow diagram illustrating a possible sequence of steps for the determination scheme that was explained in connection with FIG. 7. In step 81, the smartphone 10 creates a random time stamp. In step 82, it sends an ID request to the server 31. In step 83, the server transmits an ID based on the request. In step 84, the smartphone compares the ID with a match criterion. In step 85, the smartphone adjusts the time span during which it renders the content (and it possibly adjusts the content itself).

In the following, a possible implementation of the method of the present invention in the context of a lottery among the audience of an event venue (e.g., a sports stadium) is described.

In preparation for the lottery, software instructions for carrying out the lottery are embedded into a smartphone application (app) that is made available to the audience by the operator of the venue (e.g., an event agency). The audience members download the app and install it on their smartphones. At the venue, the audience members start the app upon instruction, e.g., upon oral instruction of a stadium speaker. To take part in the lottery, the users register through the app. This information can be entered in two ways: It can be manually typed in by the user, or it can be automatically obtained through an interface between the ticketing system of the event and the app. Upon instruction (e.g. by the stadium speaker) the registered users hold the screens of their smartphones towards the pitch or stage with the app open. The app enables the microphone and analyzes the frequencies above 17 kHz for patterns. The stadium loudspeakers now play a high frequency trigger signal. The signal starts all smartphones synchronically for a blinking pattern or light show. Two exemplary scenarios are conceived: In a first scenario, the blinking gets slower and slower until one single smartphone stays illuminated—the one of the winner. In another scenario, less and less smartphones follow the blinking until one single smartphone stays illuminated—the one of the winner. Of course, many other scenarios are conceivable.

The determination of the winner can be done in many different ways, two of these being described in the following.

According to a first possibility, connection to an IP network is available to the smartphones. After the audio trigger, each smartphone generates a randomized time stamp between 0.1 and 10 seconds. This time stamp indicates when the smartphone will request the transmission of an ID from a server. The smartphones receive an ID number according to their time of the request, starting from the number 1, ending at the total number of participating users. The smartphone with the number 1 is the winner, number 2 the second, and so on. When the lottery comes to an end (earliest after 10 seconds due to the server requests), the smartphone with the number 1 knows that it is the winner and will remain illuminated as the only smartphone in the stadium. For the case that the smartphone with the number 1 closes the app, switches off or else, the smartphone with the number 2 is contacted with an audio signal (see description of the second possibility below).

According to a second possibility, which works without network connection once registration has been completed, every smartphone gets assigned a number during registration. In advance of the lottery, a certain number, say fifteen, randomized numbers out of the set of all assigned numbers are drawn and converted into an audio signal. At some time after the trigger signal, the first of the fifteen numbers is broadcast via audio signal. If the smartphone with that number is in the stadium, it stays illuminated. If it is not, the second number will is been broadcast via audio signal and so on, until a winner has been determined.

While the invention has been described with reference to specific embodiments, it is to be understood that the invention is by no means limited to these embodiments, and that many variations and modifications are possible.

The invention claimed is:

1. A method for identifying a subset of one or more mobile computing devices out of a set of mobile computing devices, each of said mobile computing devices having a display, the method comprising:
   broadcasting a trigger signal to the set of mobile computing devices;
   receiving said trigger signal by the mobile computing devices in the set;
   rendering visual content on the displays of the mobile computing devices in the set after reception of the trigger signal;
   subsequently causing those mobile computing devices that are not part of said subset to stop rendering said visual content while those mobile computing devices that are part of said subset continue to render said visual content, until only those mobile computing devices that belong to said subset remain rendering said visual content;
   causing each mobile computing device in the set to create a random time stamp after receiving the trigger signal;
   causing each mobile computing device in the set to connect to a server and send an identifier request to said server at a point in time that corresponds to the random time stamp;
   when the server receives an identifier request from a mobile computing device, transmitting an identifier from the server to the corresponding mobile computing device; and
   determining that the respective mobile computing device is part of the subset, if the transmitted identifier meets a match criterion.

2. The method of claim 1, wherein after the rendering of content has been started, a gradually decreasing number of mobile computing devices in the set continues to render visual content, until only those mobile computing devices that belong to said subset remain rendering said visual content.

3. The method of claim 1, wherein each mobile computing device in the set is assigned an identifier, and the method further comprises:
   selecting a subset of the identifiers;
   transmitting selection data to mobile computing devices in the set, the selection data representing the selected subset;
   receiving the selection data by the mobile computing devices in the set;
   in each mobile computing device that has received the selection data, comparing the received selection data with the identifier of the respective mobile computing device;
   determining that the respective mobile computing device is part of the subset, if the identifier matches the selection data.

4. The method of claim 3, wherein the selection data are transmitted to the mobile computing devices in the set via an audio signal.

5. The method of claim 1, wherein the transmitted identifiers define a sequential order of the mobile computing devices in the set according to the sequence of reception of the identifier requests by the server, and wherein the subset of mobile computing devices consists of the first n mobile computing devices in the sequence, n being a natural number that is at least one.

6. The method of claim 1, wherein the method implements a lottery, the mobile computing devices in the subset being assigned a lottery prize.

7. The method of claim 1, wherein the method implements an emergency response scheme, said visual content comprising an alert to an emergency situation.

8. The method of claim 1, wherein the set of mobile computing devices is located at a venue.

9. A mobile computing device comprising:
   a processor;
   a display; and
   a non-transitory memory device storing software instructions to cause the processor to carry out the following method:
      receiving a trigger signal;
      upon detection of the trigger signal, causing the display to render visual content;
      determining whether the mobile computing device is part of a subset of a set of mobile computing devices; and
      depending on whether the mobile device is part of said subset, adjusting a time span during which the mobile computing device renders said visual content;
   wherein in determining whether the mobile computing device is part of said subset, the software instructions are configured to cause the processor to carry out the following method:
      creating a random time stamp after receiving the trigger signal;
      connecting the mobile computing device to a server and sending an identifier request to said server at a point in time that corresponds to the random time stamp;
      receiving an identifier from the server based upon said identifier request; and determining that the mobile computing device is part of the subset, if the identifier matches a match criterion.

10. The mobile computing device of claim 9,
wherein the non-transitory memory device or a transitory memory device of the mobile computing device stores the identifier of the mobile computing device, and
wherein in determining whether the mobile computing device is part of said subset, the software instructions are configured to cause the processor to carry out the following method:
receiving selection data representing said subset;
comparing the selection data with said identifier; and
determining that the mobile computing device is part of the subset, if the identifier matches the selection data.

11. The mobile computing device of claim 10,
wherein the mobile computing device comprises a microphone, and
wherein in receiving the selection data, the software instructions are configured to cause the processor to carry out the following method:
receiving an audio signal by the microphone; and
monitoring the audio signal to detect the selection data from the audio signal.

12. The mobile computing device of claim 9, wherein the software instructions are configured to cause the processor to determine whether the mobile computing device is part of a subset of a set of mobile computing devices in a venue.

13. A computer program product comprising a non-transitory data carrier storing software instructions for causing a processor of a mobile computing device to carry out the following method:
receiving a trigger signal;
upon detection of the trigger signal, causing a display of the mobile computing device to render visual content;
determining whether the mobile computing device is part of a subset of a set of mobile computing devices; and
depending on whether the portable device is part of said subset, adjusting a time span during which the mobile computing device renders said visual content;
wherein in determining whether the mobile computing device is part of said subset, the software instructions are configured to cause the processor to carry out the following method:
creating a random time stamp after receiving the trigger signal;
connecting the mobile computing device to a server and sending an identifier request to said server at a point in time that corresponds to the random time stamp;
receiving an identifier from the server based upon said identifier request; and
determining that the mobile computing device is part of the subset, if the identifier matches a match criterion.

14. The computer program product of claim 13,
wherein in determining whether the mobile computing device is part of said subset, the software instructions are configured to cause the processor to carry out the following method:
receiving selection data representing said subset;
comparing the selection data with an identifier stored in a non-transitory memory of the mobile computing device; and
determining that the mobile computing device is part of the subset, if the identifier matches the selection data.

15. The computer program product of claim 14,
wherein in receiving the selection signal, the software instructions are configured to cause the processor to carry out the following method:
receiving an audio signal with a built-in microphone of the mobile computing device;
monitoring the audio signal to detect the selection signal from the audio signal.

16. The computer program product of claim 13, wherein the software instructions are configured to cause the processor to determine whether the mobile computing device is part of a subset of a set of mobile computing devices in a venue.

17. A method for identifying a subset of one or more mobile computing devices out of a set of mobile computing devices, each of said mobile computing devices having a display, the method comprising:
broadcasting a trigger signal to the set of mobile computing devices;
receiving said trigger signal by the mobile computing devices in the set;
rendering visual content on the displays of the mobile computing devices in the set after reception of the trigger signal; and
subsequently causing those mobile computing devices that are not part of said subset to stop rendering said visual content while those mobile computing devices that are part of said subset continue to render said visual content, until only those mobile computing devices that belong to said subset remain rendering said visual content,
wherein after the rendering of content has been started, a gradually decreasing number of mobile computing devices in the set continues to render visual content, until only those mobile computing devices that belong to said subset remain rendering said visual content.

18. The method of claim 17, wherein the method implements a lottery, the mobile computing devices in the subset being assigned a lottery prize.

19. The method of claim 17, wherein the set of mobile computing devices is located at a venue.

20. A method for implementing a lottery by identifying a subset of one or more mobile computing devices out of a set of mobile computing devices, each of said mobile computing devices having a display, the method comprising:
broadcasting a trigger signal to the set of mobile computing devices;
receiving said trigger signal by the mobile computing devices in the set;
rendering visual content on the displays of the mobile computing devices in the set after reception of the trigger signal; and
subsequently causing those mobile computing devices that are not part of said subset to stop rendering said visual content while those mobile computing devices that are part of said subset continue to render said visual content, until only those mobile computing devices that belong to said subset remain rendering said visual content,
wherein the mobile computing devices in the subset are assigned a lottery prize.

21. The method of claim 20, wherein the set of mobile computing devices is located at a venue.

* * * * *